INVENTOR.
RICHARD E. MILFORD.
BY
ATTORNEY.

INVENTOR.
RICHARD E. MILFORD
BY
Lewis P. Elbinger
ATTORNEY.

INVENTOR.
RICHARD E. MILFORD
BY
[signature]
ATTORNEY.

INVENTOR.
RICHARD E. MILFORD
BY
Louis P. Ellinger
ATTORNEY.

United States Patent Office 3,112,469

Patented Nov. 26, 1963

3,112,469

APPARATUS FOR READING HUMAN LANGUAGE

Richard E. Milford, Glendale, Ariz., assignor to General Electric Company, a corporation of New York Filed Oct. 30, 1958, Ser. No. 770,862
16 Claims. (Cl. 340—146.3)

This invention relates to a system for automatically reading human language and in particular to apparatus for accurately abstracting information from a document by responding to particular characteristics of human language symbols provided thereon in magnetic ink.

A United States patent application by P. E. Merritt and C. M. Steele, filed October 31, 1957, Serial No. 693,773, now Patent No. 2,924,812, granted February 9, 1960, for an Automatic Reading System, which is assigned to the same assignee as the instant invention, describes and claims a system for automatically reading human language which is printed on documents as symbols in ink capable of being magnetized. The symbols are magnetized and translated in sequence past a transducer provided with a transverse slit. The transducer responds to narrow transverse portions of each symbol, as it is scanned, to generate a distinctive electrical waveshape. The waveshape delivered by the transducer is then sampled at a number of points and the samples are applied to a recognition circuit, which is adapted to energize a plurality of output leads, each output lead corresponding to a different one of the symbols to be recognized by the system. When a symbol is scanned by the transducer, the corresponding output lead provides an electrical signal representative of that symbol for associated utilization apparatus. The recognition circuit comprises a plurality of transmission channels for receiving the waveshape samples, each of the channels being adapted to produce an output signal having a greater amplitude than that produced by any other of the channels when the corresponding waveshape is being sampled; and amplitude sensing apparatus for sampling the output signals of all the channels to detect the greatest amplitude output signal, and in response thereto, for delivering a signal on the output lead corresponding to the symbol being scanned.

The reliability and accuracy of the above-described automatic reading system depends on the ability of the amplitude sensing apparatus to distinguish the greatest amplitude output signal delivered by the transmission channels from the next-greatest output signal. For purposes of the ensuing description, the numerical ratio between this greatest amplitude output signal and the next-greatest amplitude output signal for a particular symbol will be referred to as the symbol dependability factor. Thus, system reliability and accuracy is improved by improving the symbol dependability factors. However, the dependability factor is reduced under certain conditions which include: (*a*) the symbol waveshape is distorted, which occurs if the transducer slit is not properly aligned with respect to the direction of scan, if the symbols are poorly printed so that the magnetic ink is not uniformly distributed therethrough, or if the symbols are not uniformly magnetized; (*b*) the waveshape is improperly sampled, which occurs if system timing signals or timing circuits are inaccurate, or if the velocity of symbol scanning deviates from the design value; or (*c*) combinations of any of the above-mentioned conditions exist. A system wherein the effect of any, or all, of the above conditions are eliminated or reduced will be more reliable and accurate.

It is, therefore, the principal object of this invention to provide an improved system for automatically reading human language symbols.

Another object of this invention is to provide a more accurate and reliable system for accurately abstracting information from a document by responding to human language symbols printed thereon in magnetic ink.

Another object of this invention is to provide apparatus for recognizing human language symbols by identifying corresponding waveshapes derived therefrom, wherein the accuracy and reliability of said apparatus is substantially unimpaired by variations in the form of any of said waveshapes.

Another object of this invention is to provide apparatus for recognizing human language symbols printed on a document, wherein the accuracy and reliability of said apparatus is substantially unimpaired by misalignment of the transducer scanning said symbols.

Another object of this invention is to provide apparatus for recognizing human language symbols printed on a document, wherein the accuracy and reliability of said apparatus is substantially unimpaired by variations in the printing of said symbols.

Another object of this invention is to provide apparatus for recognizing human language symbols printed in magnetic ink, wherein the accuracy and reliability of said apparatus is substantially unimpaired by variations in the degree of magnetization of said symbols.

Another object of this invention is to provide apparatus for recognizing human language symbols by identifying corresponding waveshapes derived therefrom, wherein the accuracy and reliability of said apparatus is substantially unimpaired by variations in the duration of said waveshape or portions thereof.

Another object of this invention is to provide apparatus for recognizing human language symbols by identifying corresponding waveshapes derived therefrom; wherein the accuracy and reliability of said apparatus is substantially unimpaired by waveshape sampling which is earlier or later than design time.

Another object of this invention is to provide improved apparatus for recognizing each of a plurality of different waveshapes.

The foregoing objects are achieved by providing a novel automatic symbol reading apparatus of the type heretofore described, but which includes novel means for sampling the waveshapes derived from scanning the symbols. The waveshapes are applied to a delay line provided with a plurality of wave sampling taps spaced therealong. The locations of the taps along the line are adjusted to correspond with the location of the antinodes of the waveshapes to be sampled. If a particular waveshape to be sampled has $n$ antinodes, the delay line will be provided with at least $n$ wave sampling taps spaced therealong, wherein adjacent ones of said $n$ sampling taps are spaced apart along said line by a distance equal to the distance between adjacent ones of said $n$ antinodes when the waveshape is propagating along the delay line.

The invention will be described with reference to the accompanying drawings, wherein.

*Theory of Operation*

Figure 1:
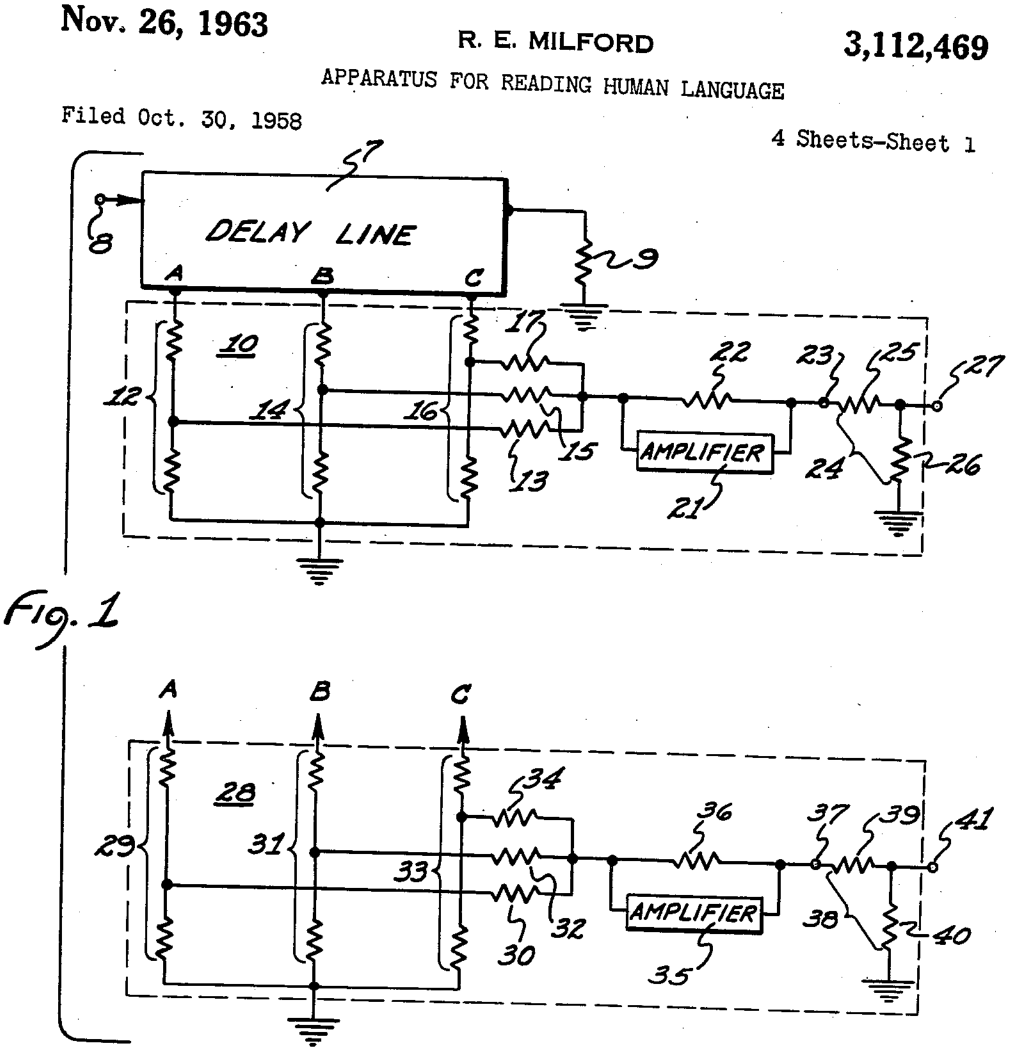
FIGURE 1 is a schematic diagram of a simplified network shown to assist in an understanding of this invention.

The simplified network of FIG. 1 is employed to explain the method by which the apparatus of this invention distinguishes between the waveshapes derived from two different symbols to be identified. A delay line 7, which is assumed to be lossless for the purpose of presenting this theory of operation, is provided with an input terminal 8 and with the usual reflection-free termination 9. Three sampling taps A, B, and C are provided along the delay line. A correlation network 10 comprises a resistor matrix having three voltage dividers 12, 14, and 16, each connected between a respective sampling tap and a voltage reference point, such as ground, and additional circuit elements to be described hereinafter. A correlation network 28 comprises a resistor matrix having three voltage dividers 29, 31, and 33, each connected between a respective sampling tap and the voltage reference point, and additional circuit elements to be described hereinafter.

Each one of correlation networks 10 and 28 is adapted to sample a traveling wave of voltage on delay line 7 at three discrete points and to deliver an output signal which is greater than that delivered by the other correlation network when this wave is derived from a respective one of the two different symbols to be identified. The voltage division ratio provided by each voltage divider of a correlation network is determined by the waveshape of the symbol to be recognized by that correlation network. Assume that correlation network 10 is adapted to identify the voltage waveshape illustrated by curve WS–1 of FIG. 2, which is derived from one of the symbols to be recognized. Similarly, correlation network 28 is adapted to identify the voltage waveshape illustrated by curve WS–2 of FIG. 3.

Figure 2:
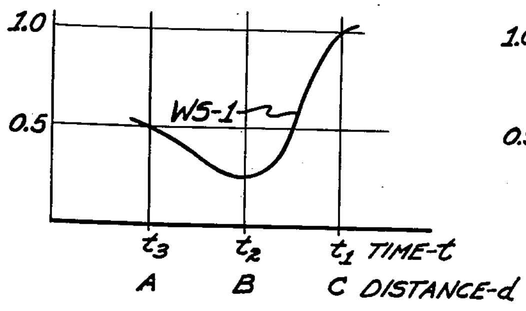
FIGURES 2 and 3 illustrate waveshapes of the type for which the network of FIG. 1 is designed to provide recognition.
Figure 3:
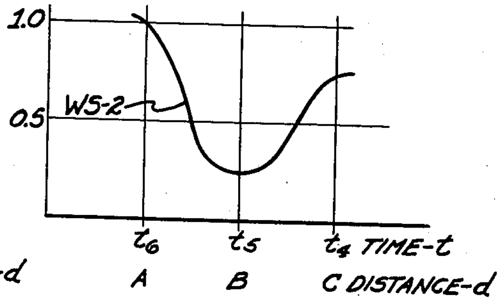

A waveshape as shown in FIGS. 2 and 3 is delivered by a transducer when relative motion is provided between the transducer and an adjacent magnetized symbol. The instantaneous value of voltage delivered corresponds to the portion of the symbol passing the transducer at that instant. For example, the instantaneous voltages appearing at times $t_1$, $t_2$, and $t_3$, respectively, may be those delivered by the transducer when scanning points near the leading edge, the center, and the trailing edge of the symbol. It will be noted that the waveshapes shown in FIGS. 2 and 3 are reversed from conventional presentations, since earlier-delivered voltages appear farther to the right than later-delivered voltages. This type of presentation will better serve to explain the operation of this invention, as it corresponds to the spatial distribution of a wave along the delay line.

The waveshape of FIG. 2 is applied to delay line terminal 8 and propagates therealong at a velocity determined by the parameters of the line. The voltage delivered at time $t_1$ is that which is applied to terminal 8 first, and it is followed later by the voltages delivered by the transducer at times $t_2$ and $t_3$. Thus, the voltages traveling along line 7 at points most distant from the input terminal 8 are those first delivered by the magnetic transducer. Curve WS–1 of FIG. 2 is employed for two different representations of these voltages: (1) One representation depicts voltage delivered by the transducer as a function of time, wherein time decreases to the right, as shown by the upper abscissal index, *t*. This representation is usually termed a "waveshape" or "waveform." (2) The other representation depicts the distribution of voltage along the delay line at one instant of time subsequent to $t_3$ as a function of distance along the delay line, as shown by the lower abscissal index, *d*. At a later instant of time, this curve would be shifted to the right in the diagram, since wave propagation is to the right in the delay line. This second representation is, therefore, that of a traveling wave of voltage on line 7. In the particular instant that the traveling wave is illustrated, the voltages delivered by the transducer at times $t_1$, $t_2$, and $t_3$ have arrived at respective sampling taps C, B, and A. In FIGS. 2 and 3, the voltages have been arbitrarily set at a maximum value of 1.0; that is, the maximum value of the portion of the waveshape to be sampled is set at 1.0 and all other portions of the waveshape are adjusted proportionally. In the instant the traveling wave of FIG. 2 is shown, the voltages at taps A, B, and C have the respective values 0.50, 0.25, and 1.00. Similarly, the voltages of the traveling wave of FIG. 3 at taps A, B, and C have the respective values 1.00, 0.25, and 0.75.

The voltage division ratio which is provided by each divider of the resistor matrices of correlation networks 10 and 28 is numerically equal to the value of voltage provided at the corresponding sampling tap at the moment the respective waveshape is in its illustrated position. This position of the waveshape in the delay line at which sampling tap voltages are employed for determining voltage division ratios of the correlation network dividers will be termed the "reference" position for that waveshape. Thus, voltage divider 12 delivers a voltage at its tapped point equal to one-half the voltage sampled at tap A, voltage divider 14 delivers a voltage at its tapped point equal to one-quarter the voltage delivered at tap B, and voltage divider 16 delivers the entire value of voltage sampled at tap C. (In this example, voltage may be taken directly from tap C, since this associated voltage divider 16 has a ratio of unity.) Therefore, the values of voltage delivered by voltage dividers 12, 14, and 16 when the waveshape of FIG. 2 occupies its reference position in delay line 7 are, respectively, $0.50\times0.50=0.25$; $0.25\times0.25=0.0625$; and $1.0\times1.0=1.0$.

Similarly, since correlation network 28 is adapted to identify waveshape WS–2, voltage divider 29 delivers a voltage at its tapped point equal to the entire value of voltage sampled at tap A, voltage divider 31 delivers a voltage at its tapped point equal to one-quarter the voltage sampled at tap B, and voltage divider 33 delivers a voltage at its tapped point equal to three-quarters the voltage sampled at tap C. Therefore, the values of voltage delivered by voltage dividers for 29, 31, and 33 when waveshape WS–1 occupies its reference position in delay line 7 are, respectively $1.0\times0.50=0.50$;

$$0.25\times0.25=0.0625; \text{ and } 0.75\times1.0=0.75$$

Referring again to FIG. 1, the respective voltages delivered at the tapped points of dividers 12, 14, and 16 of correlation network 10 are summed algebraically by means of a summing network connected to the tapped points. Three resistors 13, 15, and 17 are connected together at one of their terminals. The other terminal of each of resistors 13, 15, and 17 is connected to the respective tapped points of each of voltage dividers 12, 14, and 16. A high-gain amplifier 21 and a resistor 22 are connected in parallel between the common connection point of resistors 13, 15, and 17, and a terminal 23. Resistors 13, 15, 17, and 22 each have the same value of resistance, so that the voltage delivered at terminal 23 is the algebraic sum of the voltages provided at the tapped points of the voltage dividers. This common resistance value of resistors 13, 15, 17, and 22 is large compared with the resistance values of voltage dividers 12, 14, and 16, so that the voltages provided at the tapped points of these dividers will be substantially unaffected by the inclusion of the summing network described. (A summing network as shown is described in a book by G. A. Korn, "Electronic Analog Computers," page 11, McGraw-Hill Book Company, Inc., New York, 1952.) At the moment waveshape WS–1 occupies its reference position in line 7, the summation voltage supplied at terminal 23 has the value of 1.3125, and this voltage is the highest voltage supplied at terminal 23 during passage of waveshape WS–1 along the delay line.

Three additional resistors 30, 32, and 34 are connected together at one of their terminals. The other terminal of each of resistors 30, 32, and 34 is connected to the respective tapped point of each of voltage dividers 29, 31, and 33. A high-gain amplifier 35 and a resistor 36 are connected in parallel between the common connection point of resistors 30, 32, and 34, and a terminal 37. In the manner previously described, resistors 30, 32, 34, and 36 each have the same value of resistance, which is large compared with the resistance values of voltage dividers 29, 31, and 33. Thus, a summing network is provided for correlation network 28. At the moment waveshape WS–1 occupies its reference position in delay line 7, the summation voltage supplied at terminal 37 has the value of 1.3125. (Although the exemplary resistor matrices of FIG. 1 provide equal output voltages at the voltage summation terminals 23 and 37 when waveshape WS–1 is sampled, this equality is not the general rule. Normally, the summation voltages will differ for each correlation network.)

A voltage divider 24 (FIG. 1), comprising series-connected resistors 25 and 26, is connected between terminal 23 and ground. Divider 24 is adapted to multiply the voltage of terminal 23 by a predetermined factor for "normalizing" the gain of one matrix as compared to the other matrix and to supply the resulting voltage at an output terminal 27, which is connected to the common junction point of resistors 25 and 26. Specifically, divider 24 is designed to multiply the voltage at terminal 23 by a value inversely proportional to the square root of the sum of the squares of the voltage division ratios of the resistor matrix of correlation network 10, in this instance the voltage division ratios of voltage dividers 12, 14, and 16; that is, $$(1) \qquad V_{27}=V_{23}\times\frac{k}{\sqrt{r_{12}^2+r_{14}^2+r_{16}^2}}$$

where V represents a terminal voltage, $r$ is a voltage division ratio, and $k$ is a consant of proportionality. For the numerical values of the example described above, $$(2) \qquad V_{27}=V_{23}\frac{k}{\sqrt{1.3125}}=0.873kV_{23}$$

In this particular instance, $k$ may be set equal to unity, so that the voltage division ratio of divider 24 is 0.873.

A voltage divider 38 comprising series-connected resistors 39 and 40 is connected between terminal 37 and ground. Divider 38 is adapted to multiply the voltage of terminal 37 by a normalizing factor corresponding to Equation 1, and to supply the resulting voltage at an output terminal 41, which is connected to the common junction point of resistors 39 and 40. This factor, which is based on the resistor matrix of correlation network 28, is given by, $$(3) \qquad V_{41}=0.784kV_{37}$$

Since the value of $k$ of Equation 2 was set equal to unity, the value of $k$ of Equation 3 is set equal to unity, so that the voltage division ratio of divider 38 is 0.784.

As has been mentioned previously, when waveshape WS–1 occupies its reference position in delay line 7, the voltages at terminals 23 and 37 will each be 1.3125. The voltage at output terminal 27 is 1.146 and at output terminal 41 is 1.029. Therefore, the network of FIG. 1 recognizes waveshape WS–1 and its corresponding symbol, by delivering the larger output voltage at terminal 27. On the other hand, if waveshape WS–2 occupies its reference position in delay line 7, the voltages at terminals 23 and 37 will be respectively 1.3125 and 1.6250. The voltage at output terminal 27 is 1.146 and at output terminal 41 is 1.273. Therefore, the network recognizes waveshape WS–2, and its corresponding symbol, by delivering the larger output voltage at terminal 41. Thus, it is desirable that a complete correlation network include the function of the resistor matrix, the function of the summing network, and the function of the voltage divider designed in accordance with the theory of Equation 1.

*A Complete Symbol Recognition System*

In the embodiment of this invention, a correlation network is provided for each different symbol to be recognized. Each correlation network comprises a resistor matrix having a design conditioned by the corresponding waveshape. Each voltage divider of the matrix has a voltage division ratio equal to the value of the voltage anticipated at the sampling tap to which the divider is connected when the corresponding waveshape occupies its reference position in the delay line. Each correlation network further includes a summing network for combining arithmetically the voltages provided at all tapped points of the voltage dividers of the resistor matrix. A further voltage divider in each correlation network normalizes the output voltage of the summing network by a factor determined in accordance with the theory of Equation 1.

The waveshape applied to the delay line is filtered so that its maximum frequency component is less than a predetermined frequency W. The delay line is provided with $h$ or more taps so that the waveshape is sampled at $h$ or more points, where $$(4) \qquad h=2WT$$

and T is the duration of the waveshape. Each correlation network then delivers an output voltage, when the corresponding waveshape occupies its reference position in the delay line, greater than that delivered by any other correlation network. A waveshape is recognized by sensing the output voltages delivered by all correlation networks at the moment the waveshape occupies its reference position in the delay line, by determining the greatest of these voltages, and by producing an output signal identifying the correlation network delivering the greatest output voltage. A theoretical analysis and proof of the operation of a recognition system employing correlation networks, and details of system design are provided in the aforementioned patent application Serial No. 693,773, now Patent No. 2,924,812.

The above-described theory of operation and the analysis and proof of patent application S.N. 693,773, now Patent No. 2,924,812, are based on the premise that no more than one waveshape, or part thereof, is present in the delay line and are further based on the premise that the waveshape present in the delay line is one which the apparatus is designed to recognize; i.e., that the design of one correlation network of the system was conditioned on the waveshape present. The latter premise may not exist when the symbol waveshape is distorted for any one of the reasons previously described. Furthermore, a satisfactory waveshape may appear to the recognition system as a distorted or improper waveshape if it is improperly sampled for any one of the reasons previously described. In the prior art apparatus, when the waveshape is distorted or is improperly sampled, the symbol dependability factor is reduced, whereupon the difference between the greatest correlation network output voltage and the next-largest correlation network output voltage is correspondingly reduced. Consequently, error detection apparatus, which is employed to actuate an alarm when the symbol dependability factor is less than a predetermined value, may be activated when the waveshape is distorted or improperly sampled. Data abstracted from a document, when the error alarm is actuated, is automatically rejected.

This invention is intended to substantially reduce the amount of such data which is rejected by providing for increased symbol dependability factors and by insuring that the respective factors for each symbol remain fairly constant despite waveshape distortion or improper waveshape sampling.

*Correlation Networks*

In designing the correlation networks of this invention, the various waveshapes which are derived by scanning the different symbols to be recognized must be known in advance. Each of these waveshapes can be computed from the shape and area of the corresponding symbol or can be determined visually by repeatedly scanning the magnetized symbol with a transducer and applying the output of the transducer to a cathode-ray oscilloscope. The relative amplitudes of a number of points on the waveshape, corresponding to the positions of the delay line sampling points when the waveshape is in its preferred reference position, are used to determine the values of the voltage division ratios of the resistor matrix. From the anticipated waveshape samples, a factor is computed in accordance with the theory of Equation 1, and an appropriate attenuator is designed to cooperate with the resistor matrix.

Figure 4:
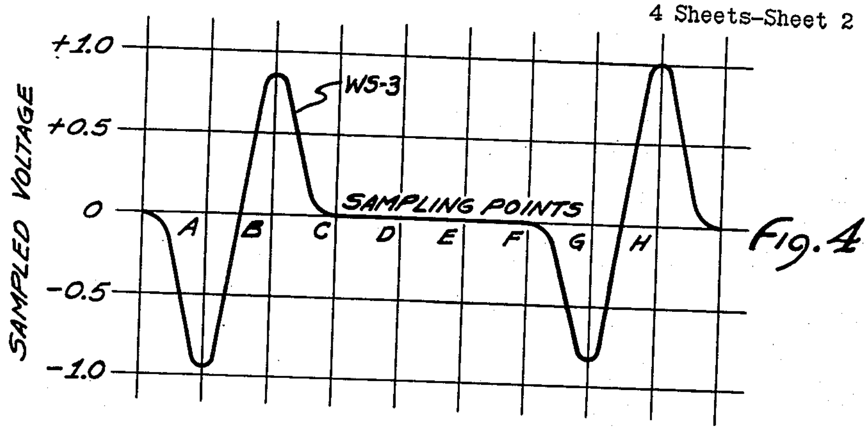
FIGURE 4 illustrates the waveshape derived from one of the symbols which the embodiment of this invention is adapted to recognize.
Figure 5:
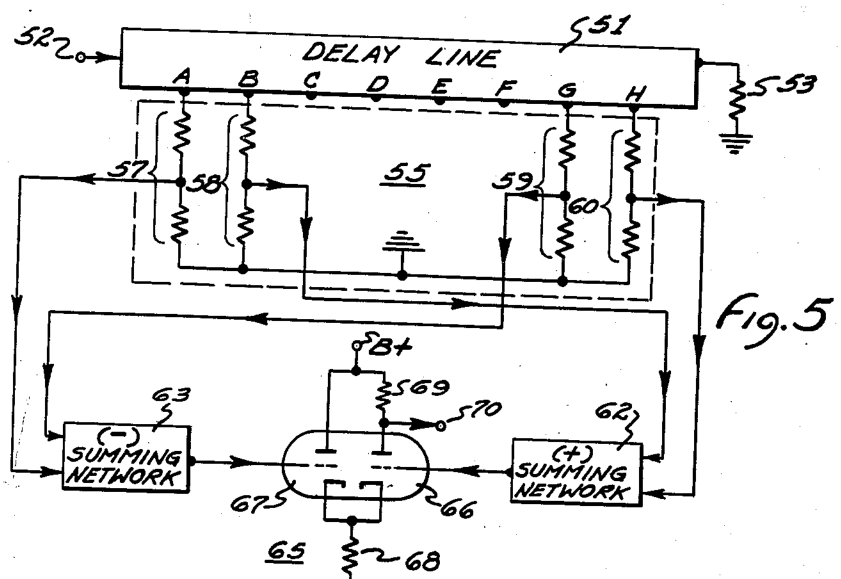
FIGURE 5 is a circuit diagram of a resistor matrix and the summing circuits employed therewith.

FIGURES 4 and 5 illustrate an actual waveshape to be recognized and portions of the correlation network corresponding to this waveshape. Waveshape WS-3 of FIG. 4 is that derived by scanning the magnetized numeral "0." The form of waveshape WS-3 is due to the fact that the transducer employed in this embodiment provides an output signal representing the time rate-of-change of the symbol magnetic flux sensed by said transducer. The "0" waveshape is the longest to be identified by the instant embodiment, and is approximately of 780 microseconds duration. Waveshape WS-3 and the other waveshapes to be recognized by this invention have both positive-going and negative-going portions.

A delay line 51 of FIG. 5 is provided with an input terminal 52 to receive the waveshapes to be identified and with the usual reflection-free termination 53. Delay line 51 is provided with eight sampling taps A-H. Adjacent sampling taps are spaced apart by the distance a wave travels along delay line 51 in 86.7 microseconds. The total delay provided between sampling taps A and H is 606 microseconds. Thus, waveshape WS-3 is sampled at eight points lying between the extremities thereof.

A resistor matrix 55 comprises voltage dividers 57, 58, 59, and 60, each of which is connected between one of respective sampling taps A, B, G, and H and ground. Each of voltage dividers 57–60 is designed with a voltage division ratio equal to the value of voltage provided at the corresponding sampling tap when waveshape WS-3 is in the position shown in FIG. 4. For example, the voltage division ratio of voltage divider 57 is approximately 0.95, and that of voltage divider 58 is approximately 0.85. Inasmuch as the voltages provided at sampling taps C—F are substantially zero when waveshape WS-3 is in its reference position, the corresponding voltage division ratios are zero and, therefore, the corresponding voltage dividers of resistor matrix 55 may be omitted. A procedure for modifying the voltage division ratios of dividers 57–60 when delay line 51 has substantial losses therein is described in the aforementioned patent application S.N. 693,773.

All positive voltages to be delivered by the voltage dividers of matrix 55, when waveshape WS-3 is in its reference position, are added numerically in a summing network 62. Similarly, all negative voltages delivered by the voltage dividers of matrix 55 are added numerically in a summing network 63. Thus, the tapped points of voltage dividers 58 and 60 are connected to summing network 62, and the tapped points of voltage dividers 57 and 59 are connected to summing network 63. Summing networks 62 and 63 may be of the type shown in FIG. 1, or of any other type known in the art.

The output voltages of summing networks 62 and 63 are applied to a difference amplifier 65, the output signal thereof representing the sum of the magnitudes of all the voltages delivered by the voltage dividers of matrix 55 when waveshape WS-3 is in its reference position. The positive summation voltage delivered by summing network 62 is applied to the control grid of a first electron tube amplifier section 66. The negative summation voltage delivered by summing network 63 is applied to the control grid of a second electron tube amplifier section 67. Section 66 provides a negative output signal proportional to the algebraic difference between the voltages of two input signals applied respectively to the control grid and cathode thereof. Section 67 functions as a cathode follower in order to apply a signal corresponding to that delivered by summing network 63 to the cathode of section 66. The signal applied to the cathode of section 66 by the cathode follower is developed across the cathode follower load resistor 68. (If cathode follower section 67 attenuates the negative summation voltage applied to the cathode of section 66, the positive summation voltage delivered by summing network 62 may be attenuated a corresponding amount by insertion of a voltage divider network between the output terminal of summing network 62 and the control grid of section 66.) The output difference voltage generated by section 66 is developed across a load resistor 69, which is connected to the plate of section 66, and is delivered at an output terminal 70. Therefore, the negative signal provided at terminal 70 represents the sum of the magnitudes of all output voltages delivered by the dividers of resistor matrix 55 when waveshape WS-3 is in its reference position.

In the complete correlation network, the output signal delivered by terminal 70 is modified by application to a further voltage divider network designed to attenuate the signal applied thereto in accordance with the theory of Equation 1. Although such voltage divider is not shown in FIG. 5, it is described in the subsequent detailed explanation of the operation of a complete symbol recognition system embodiment.

The resistor matrices of all correlation networks employed in the complete system are also connected to sampling taps A—H of delay line 51. Corresponding voltage dividers of all the resistor matrices are connected in parallel between their respective delay line sampling taps and ground. In the embodiment to be subsequently described, ten symbols are to be identified, so that the voltage dividers of ten resistor matrices are connected to the respective sampling taps of delay line 51. In addition to these ten resistor matrices, a waveshape presence resistor matrix, to be described later, is also connected to the sampling taps of delay line 51.

*Magnetic Symbol Style*

Figure 6:
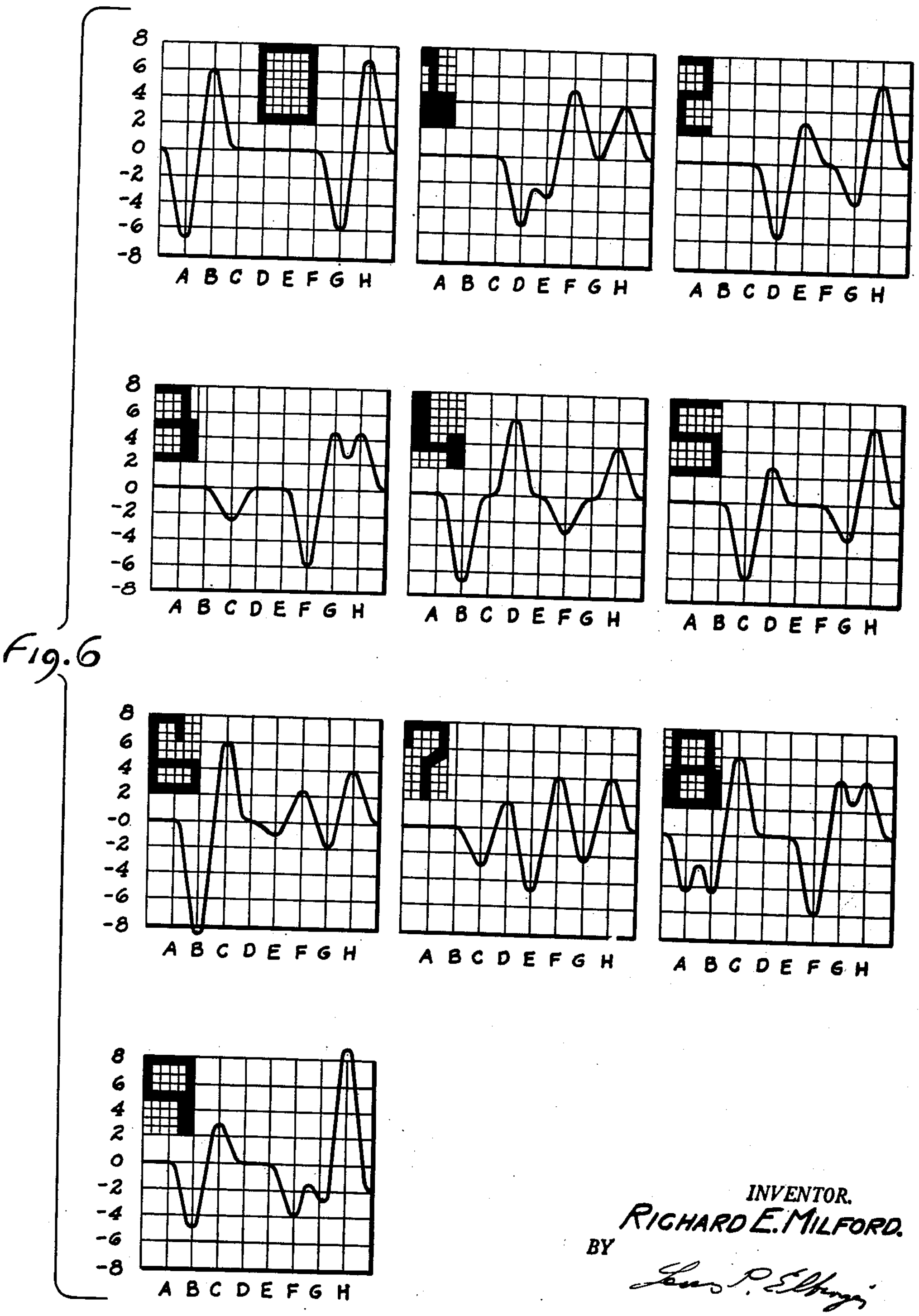
FIGURE 6 illustrates ten symbols adapted to be employed with the embodiment of this invention and their corresponding waveshapes.

A magnetic symbol style adapted to provide extremely reliable performance when employed in cooperation with the subject invention is shown in FIG. 6. A co-pending United States patent application by R. E. Milford, Serial No. 770,788, which is assigned to the same assignee as the instant invention, describes and claims a system employing such a magnetic symbol style. Each symbol of this style comprises a continuous region of magnetizable material distinguishable from the document on which it is imprinted. Each symbol region comprises a plurality of parallel straight boundaries, the total height of the magnetizable material between adjacent boundaries being substantially constant. The total height of magnetizable material of each symbol changes appreciably at a number of these boundaries, but nowhere else. Inasmuch as the transducer employed for scanning the symbols is responsive to the time rate-of-change of the total magnetic material height passing the transducer, waveshape maxima or antinodes are delivered by the transducer at each of the boundaries where the total height of magnetic material changes and zeros or nodes are delivered when the transducer scans across the boundaries where no total magnetic material height change occurs. Thus, each of the magnetic symbols of FIG. 6 is shown imprinted as a region comprising seven or fewer contiguous parallel vertical zones, each zone being distinguished from an adjacent one by a vertical boundary. It is seen that the total height of each character changes only at these boundaries. For example, the symbol "8" changes in total height of magnetizable material only at the first, second, third, sixth, seventh, and eighth boundaries. Some of the symbols are shown to have slightly rounded corners. Employing such rounded corners simplifies certain printing or reproduction processes. However, it is preferred that the number and radii of these rounded corners be held to a minimum.

A symbol is scanned by the transducer from right to left. The waveshapes derived from scanning each symbol are also shown in FIG. 6. The lettered ordinates correspond to the delay line sampling taps when the waveshape occupies its reference position in the delay line. Each ordinate designated H corresponds to the first waveshape antinode, which is generated when the transducer encounters the right edge of the symbol. All ordinates designated H to A, successively, correspond respectively to the waveshape portions generated as the eight symbol boundaries are scanned from right to left. Large antinodes occur at those boundaries where there is a large change in total symbol height and nodes occur at those boundaries where the total height of the symbol does not vary. For example, a waveshape is derived from the symbol "8" as follows: At the right boundary, the transducer encounters an initial height of magnetized material of approximately 4½ units. A positive antinode is generated by the transducer and is shown at the H ordinate. At the second boundary from the right, the total height of magnetized material increases another 4½ units, so that an antinode equal to that of ordinate H is generated and appears at ordinate G. At the third boundary, the total height of magnetic material is reduced by six units. The resulting large negative antinode is shown at ordinate F. No change in total height is encountered at the next two boundaries, so that the waveshape has nodes at ordinates E and D. The magnetic material increases in total height by six units at the sixth boundary. The large corresponding antinode is shown at ordinate C. At each of the seventh and eighth boundaries, the total height of the magnetic material is reduced by 4½ units, resulting in a pair of equal amplitude, negative antinodes shown at ordinates B and A.

*Automatic Symbol Reader Embodiment*

Figure 7:
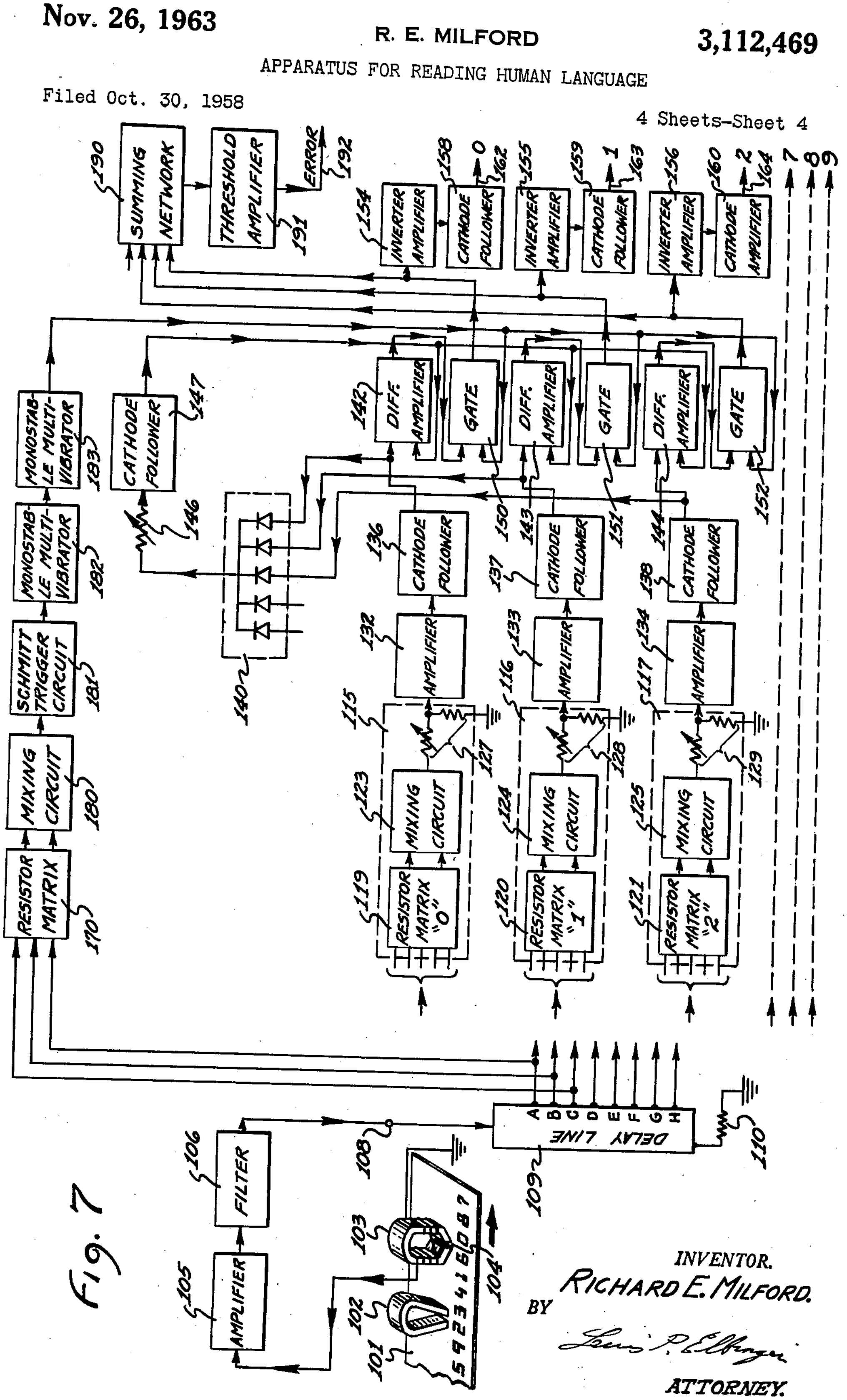
FIGURE 7 is a schematic diagram of an embodiment of this invention.

FIGURE 7 describes an embodiment of this invention and includes the correlation networks heretofore described, circuits for interpreting the output signals of the correlation networks, and associated input equipment. This embodiment is designed to recognize the numerals 0–9, imprinted in the style of FIG. 6. However, it is to be understood that the scope of this invention is neither limited to the recognition of numerals nor to the recognition of symbols having the style shown in FIG. 6. Instead, letters and other symbols, such as +, −, punctuation marks, or other geometric configurations of various styles, may be recognized by this invention.

In FIG. 7 there is shown a document 101, such as a sheet of paper, which has symbols, as described, imprinted thereon in ink adapted to be magnetized. Document 101 is moved past a magnet 102 and then past a transducer 103, which may also be termed "a magnetic reading head." Magnet 102, which may be a permanent magnet, magnetizes the symbols to be recognized prior to their "reading" by head 103. Head 103 is provided with a narrow slit 104 oriented transversely to the direction of motion of document 101 and substantially parallel to the aforementioned symbol boundaries. Head 103 is responsive to the time rate-of-change of the magnetic flux induced therein by the passing magnetized symbols and delivers an output signal corresponding to these flux changes. Thus, the output signal provided by head 103 is a function of time, the magnitude thereof at any instant being determined by the shape and orientation of the magnetized area passing slit 104 at that moment. The waveshapes of FIG. 6 are those generated as relative motion is provided between head 103 and the respective magnetized symbols.

The output signal of reading head 103 is applied to an amplifier 105, the output signal of which is applied in turn to a low-pass filter 106. The signal passed by filter 106 is applied to an input terminal 108 of a delay line 109, which is provided with the usual reflection-free termination 110. Although filter 106 is employed to limit the highest waveshape frequency in accordance with the number of delay line sampling taps provided, its filtering function may also be realized in head 103, amplifier 105, or line 109, or any combination thereof.

In accordance with the principles of this invention, delay line 109 is provided with a plurality of taps A—H spaced therealong, the spacing between the taps corresponding with the spacing of the aforementioned nodes and antinodes of the waveshapes propagating along the delay line. The spacing between adjacent ones of these taps is equal to the distance between voltage points on the waveshapes traveling along line 109 that are generated at corresponding adjacent boundaries of the symbols of FIG. 6. For example, the spacing between taps G and H is equal to the distance a wave travels along line 109 during an interval equal to that required for the first two boundaries of a symbol to pass reading head slit 104. With this tap spacing, each voltage antinode generated at a symbol boundary will be opposite a corresponding tap when the waveshape occupies its reference position in line 109, as shown in FIG. 6. For example, the first-generated antinode of the symbol 0 is opposite tap H and the last-generated antinode is opposite tap A. The four successive nodes corresponding to the four internal boundaries are opposite taps C, D, E, and F. Inasmuch as the boundaries of each symbol of FIG. 6 are shown to be equispaced, tapes A—H are equispaced along line 109.

In accordance with the principles of this invention, if the waveshape to be sampled has $n$ antinodes, the sampling delay line will be provided with at least $n$ wave sampling taps spaced therealong, wherein adjacent ones of the $n$ sampling taps are spaced apart along the delay line by a distance equal to that between adjacent ones of said $n$ antinodes when the waveshape is propagating along the line. In this manner, when the waveshape occupies its reference position in the delay line, each antinode is opposite a respective tap.

If the symbols provided have the style shown in FIG. 6, each delay line tap will be opposite either a node or an antinode when the waveshape is in its reference position. A waveshape is sampled only at specific points therealong where the waveshape slope is zero. Therefore, the voltages obtained from the sampling taps will be substantially unaffected by small distortions in symbol waveshape caused by reasons previously given; or by small errors in waveshape sampling, which occur if the system timing signals or timing circuits are inaccurate, or if the velocity of symbol scanning deviates from the design value. Furthermore, the voltages obtained from the sampling points will be substantially unaffected by extraneous voltages or noise, which will normally occur between the sampling taps. Consequently, a symbol recognition system, wherein the wave sampling taps of the delay line are located as above described, will be more reliable and accurate.

Ten correlation networks are provided for identifying each of the respective ten numerals 0–9. The design of each of these correlation networks is conditioned by the respective one of the symbol waveshapes to be recognized. Only three of these correlation networks 115, 116, and 117, and their cooperating electronic apparatus, are shown in FIG. 7 for the purpose of simplicity. Each correlation network comprises a resistor matrix, a mixing circuit, and a voltage divider connected in cascade. For example, correlation network 115 comprises a resistor matrix 119, a mixing circuit 123, and a voltage divider 127. The sampling taps of delay line 109 are connected to corresponding voltage dividers of the resistor matrices of all of the correlation networks. The design of each correlation network resistor matrix is conditioned by the corresponding symbol waveshape in the manner heretofore described. Each correlation network mixing circuit comprises the necessary positive and negative summing networks and a difference amplifier, as shown in FIG. 5. Each of voltage dividers 127, 128 and 129 is designed to attenuate the corresponding mixing circuit output voltage in accordance with the theory of Equation 1.

The apparatus to the right of each of correlation networks 115–117 is employed to interpret the signals provided by the correlation networks, and in response thereto, to deliver an output signal on only one of a number of leads, said output signal corresponding to the symbol scanned. The output signal from each of correlation networks 115–117 is applied to a respective one of amplifiers 132, 133, and 134, where the signal is inverted and amplified. The output signal from each of amplifiers 132–134 is applied in turn to a respective one of cathode followers 136, 137, and 138. The output signal from each of cathode followers 136–138 is applied to a respective one of the diodes of a peak detector 140. The output signal from each of cathode followers 136–138 is also applied to one input terminal of a respective one of difference amplifiers 142, 143, and 144.

Peak detector 140 is adapted to receive a plurality of signals applied respectively to the diodes thereof and to deliver a signal at its output terminal substantially equal to the most positive of the received signals. Several forms of peak detectors are well known in the art. A logical OR-gate is one form of peak detector which may also be employed. Ten signals from the ten cathode followers associated with the correlation networks are applied respectively to the ten diodes of detector 140. Thus, the output signal of peak detector 140 is substantially equal to the most positive of these ten applied signals.

The output terminal of peak detector 140 is connected to an attenuator 146, which in turn is connected to a cathode follower 147. The function of attenuator 146 will be described below.

The output signal from cathode follower 147 is applied to the other input terminal of each of the ten difference amplifiers; i.e., difference amplifiers 142–144. Each of difference amplifiers 142–144 may be of a type well known in the art, such as that shown in FIG. 5. Other useful difference amplifiers are shown in a book by G. E. Valley, Jr., and H. Wallman, "Vacuum Tube Amplifiers," sec. 11.10, McGraw-Hill Book Company, Inc., New York, 1948. Each of the difference amplifiers of FIG. 7 is one which provides an output voltage that is positive with respect to an arbitrary reference voltage only if a signal applied to one of its input terminals exceeds a signal applied to its other input terminal; otherwise, the output voltage is negative. Each of difference amplifiers 142–144 is so connected that only when the signal received from the corresponding one of cathode followers 136–138 exceeds the signal received from cathode follower 147 does it deliver a positive output voltage.

Attenuator 146 is adjusted to attenuate a signal applied thereto by a small predetermined amount so that the only one of the difference amplifiers 142–144 which delivers a positive output voltage is the one receiving the most positive signal from cathode followers 136–138. More specifically, attenuator 146 is set so that the signal delivered by cathode follower 147 is always more positive than the second largest signal provided by cathode followers 136–138 for each waveshape derived from a symbol to be recognized, when such waveshape occupies its reference position in the delay line. Thus, when any one of the ten waveshapes to be recognized is applied to delay line 109, only the corresponding one of the ten difference amplifiers delivers a positive output voltage when the waveshape is at its reference position. However, when an improper waveshape is present, the most positive output voltage from the ten cathode followers 136–138, etc., may not exceed the next-greatest output voltage by an amount greater than the amount of attenuation provided by attenuator 146, so that the output signal from cathode follower 147 is greater than two or more of the signals provided by cathode followers 136–138, etc. Thus, two or more of difference amplifiers 142–144, etc., deliver positive output voltages, resulting in the actuation of an alarm by apparatus to be subsequently described. A larger symbol dependability factor for all symbols to be recognized permits the use of greater attenuation by attenuator 146. This improves reliability since distorted or improperly sampled waveshapes are less likely to result in the delivery of positive voltages by two or more of the difference amplifiers.

The output signals from difference amplifiers 142–144 are applied to respective signal input terminals of gates 150, 151, and 152. Each of these gates is an amplifier type of gate, providing an output signal that is the amplified inverse of its gated input signal. Only when the input signal and the gating pulse applied thereto each exceed a reference or threshold voltage does the gate conduct. Suitable gates for this purpose are shown in a book by Engineering Research Associates, "High Speed Computing Devices," sec. 4—3—3, McGraw-Hill Book Company, Inc., New York, 1950. The object of gates 150–152 is to provide for sampling the output voltages of the corresponding difference amplifiers only when the waveshape is in its reference position in the delay line. A positive sampling trigger signal, which is provided when the waveshape reaches its reference position, is applied as the gating pulse to the other input terminal of each of gates 150–152. In this manner, erroneous output signals are avoided when the symbols are spaced so closely together that portions of waveshapes derived from scanning two successive symbols may be in delay line 109 simultaneously.

Each of gates 150–152 is connected to a respective one of inverter amplifiers 154, 155, and 156. Only those gates receiving a positive input signal from the corresponding difference amplifier will deliver output signals, which are of negative polarity. These output signals of gates 150–152 are amplified and inverted by inverter amplifiers 154–156 and applied to a respective one of cathode followers 158, 159, and 160. Each of cathode followers 158–160 delivers its output signal on a respective one of output leads 162, 163, and 164. Therefore, whenever a waveshape reaches its reference position in delay line 109, a sampling trigger signal actuates gates 150–152 in order to sample the respective output voltages of difference amplifiers 142–144. If the waveshape is derived from one of the symbols to be recognized, a positive output signal will be provided by the corresponding one of the output leads, identified by the numerals written thereby. For example, if the symbol "0" was scanned, a signal is provided on lead 162. If an improper waveshape is present, output signals will usually be provided on two or more of these output leads.

*Waveshape Presence Circuits*

Generation of a sampling trigger signal is initiated in a waveshape presence resistor matrix 170 (FIG. 8), which samples the leading edge of the waveshape as it enters delay line 109. Matrix 170 comprises voltage dividers 171, 172, and 173 connected to respective sampling taps A, B, and C of delay line 109. It is the function of resistor matrix 170 and the circuit elements associated therewith to sense the presence of the leading edge of a waveshape as it enters delay line 109, and in response thereto, to generate a sampling trigger signal when the waveshape reaches its reference position in the delay line. The voltage division ratios of all of dividers 171, 172, and 173 are alike and may be identified numerically as "y." The tapped points of dividers 172 and 173 are connected to a summing network 174, of the type previously described. The output voltages of summing network 174 and voltage divider 171 are applied to a difference amplifier 175, of the type previously described. Thus, the output signal of difference amplifier 175 is given by $$V=y[V_A-(V_B+V_C)] \quad (5)$$

where $V_A$, $V_B$, and $V_C$ represent the voltages delivered at respective sampling taps A, B, and C.

Referring now to any one of the waveshapes of FIG. 6, it is seen that as this waveshape enters delay line 109, sampling tap A is first to deliver an output voltage, which is positive. Thus, the first portion of the leading edge of the symbol waveshapes provides an increasing negative output voltage at output terminal 176 of difference amplifier 175. As the waveshape progresses further along line 109, the output voltages from sampling taps B and C, which are added together, become more positive and increasingly significant. Eventually, the signal delivered by summing network 174 becomes equal to that delivered by voltage divider 171, so that the output voltage of difference amplifier 175 passes through zero and becomes positive. This change in output signal polarity of amplifier 175, occasioned by the advance of the waveshape leading edge along delay line 109, is employed to indicate the presence of the waveshape in the delay line and to provide the aforementioned sampling trigger signal.

Figure 8:
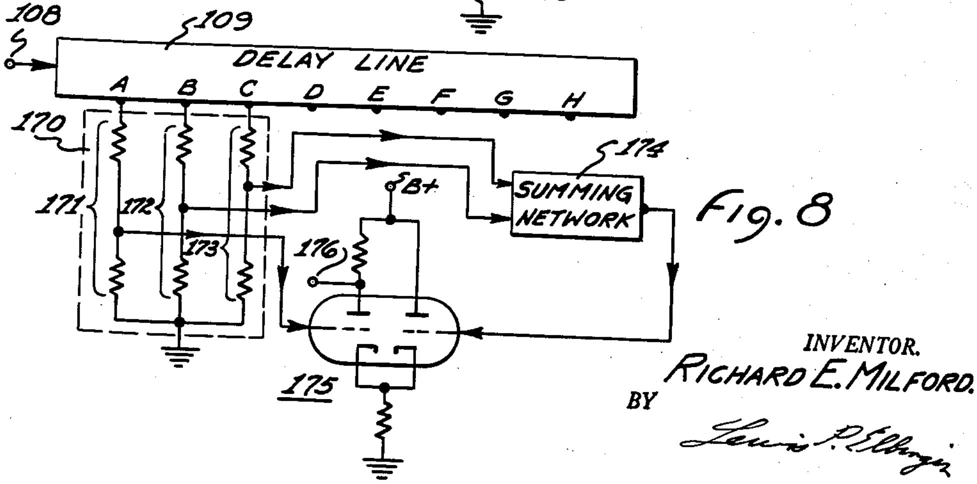
FIGURE 8 is a circuit diagram of an additional resistor matrix and the summing circuits employed therewith.

Referring once more to FIG. 7, resistor matrix 170 is shown connected to a mixing circuit 180, which comprises summing network 174 and difference amplifier 175 of FIG. 8. The output signal of mixing circuit 180 is that of difference amplifier 175. As has been previously described, the swing of the output signal of mixing circuit 180 through zero to a positive value is employed to indicate the presence of the waveshape in the delay line.

The output signal of mixing circuit 180 is applied to a Schmitt trigger circuit 181. The Schmitt trigger circuit is a well known type of network, which is driven from a first state to a second state, where it remains so long as the input voltage applied thereto exceeds a predetermined level. Upon reduction of the input voltage to a particular lower level, the Schmitt trigger circuit returns to its first state. An example of such a circuit is shown in a book by L. W. Von Tersch and A. W. Swago, "Recurrent Electrical Transients," page 277, Prentiss-Hall, Inc., New York, 1953. Thus, trigger circuit 181 is driven to its second state when the output signal of mixing circuit 180 goes through zero and becomes positive. The output signal of trigger circuit 181 is applied to a first monostable multivibrator 182, which in turn drives a second monostable multivibrator 183. Each of these monostable multivibrators is adapted to deliver an output signal at a predetermined time after application of an input signal thereto. Multivibrator 182 determines the delay before an output pulse is provided by multivibrator 183, following the time when the output signal of mixing circuit 180 passes through zero and becomes positive. This delay is that necessary for the waveshape to move to a position close to its reference position in the delay line.

Multivibrator 183 generates a positive output signal having a duration equal to that of the desired sampling trigger signal. The sampling trigger signal is sufficiently broad, for example of approximately 15 microseconds duration, to insure that the waveshape reaches its reference positon during the occurrence thereof. The output signal of multivibrator 183 is applied as a gating pulse to each of gates 150–152.

*Error Indication Circuit*

When the sampling trigger signal is applied to gates 150–152, an output signal is provided by the corresponding gate if the waveshape present in line 109 is one derived from a symbol to be recognized. If the waveshape present in the line is an improper one, two or more of these gates will usually provide an output signal, an alarm is actuated, and all data from that document may be rejected.

The circuit for actuating the alarm comprises a summing network 190 and a threshold amplifier 191. The output terminals of all of gates 150–152 are connected to respective input terminals of summing network 190. Summing network 190 is adapted to provide an output signal corresponding to the algebraic sum of the input signals applied thereto, such as the summing networks previously described. Thus, the amplitude of the output signal of summing network 190 corresponds to the number of gates providing output signals. The output terminal of summing network 190 is connected to the input terminal of a threshold amplifier 191. Such an amplifier may be one of many types, such as an amplifier biased beyond cut-off. Threshold amplifier 191 is adapted to provide an output signal on an output lead 192 whenever the input signal applied thereto exceeds a predetermined level, and more specifically, to provide an output signal when summing network 190 receives two or more input signals. Therefore, a signal delivered on lead 192 is indicative of the fact that an improper waveshape has been received by the apparatus, and such signal constitutes an alarm. This output signal of lead 192 will normally be employed to reject all the data derived from the document being scanned.

*Summary*

There has thus been described apparatus for automatically reading human language symbols printed on a document by recognizing respective waveshapes derived from these symbols, wherein the reliability and accuracy of said apparatus is substantially unaffected by distortion or improper sampling of said waveshapes. Although the embodiment employed to illustrate the principles of this invention provided for correlation networks to identify the symbol waveshapes by analyzing waveshape samples, neither the invention nor its application is to be considered as so limited. The symbol waveshapes may be recognized by other means. For example, a patent application by K. R. Eldredge, filed May 6, 1955, Serial No. 506,598, for an Automatic Reading System, which is assigned to the same assignee as the instant invention, describes and claims apparatus for recognizing waveshapes by deriving digital codes directly from waveshape samples. The principles of the instant invention are also applicable to such apparatus for improving the reliability and accuracy thereof.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. Apparatus for distinguishing between waveshapes of different form, each waveshape having $m$ nodal points and $n$ antinodal points, all of said points being equally spaced apart in time in each waveshape, said apparatus comprising a wave transmission structure for propagating said waveshape therealong and on which all of said nodal and antinodal points of any waveshape to be distinguished lie at one time, said structure being provided with means for sampling each waveshape only at nodal and antinodal points comprising $m+n$ wave sampling taps spaced therealong, wherein adjacent ones of said $m+n$ sampling taps are spaced apart along said structure by a distance substantially equal to the distance between adjacent ones of said points when said waveshape is propagating along said structure, and waveshape recognition means connected to said taps for simultaneously sampling the voltage at said sampling taps when said nodal and antinodal points are in alignment with corresponding ones of said sampling taps.

2. Apparatus for analyzing each of a plurality of different symbols borne on a document; wherein each of said symbols comprises a continuous area of material distinguishable from said document by a transducer; said area comprising $n$ internal parallel straight boundaries; the extent of said area in a direction parallel to said boundaries being substantially constant between each adjacent pair of boundaries, but changing appreciably at $n—m$ of said boundaries, where $m$ is less than $n$: comprising a transducer responsive to said symbol areas for generating an output signal corresponding to the portion of said area opposite said transducer; means for providing relative motion between said document and said transducer in a direction transverse to said boundaries, whereby said transducer generates a waveshape for each symbol scanned comprising $n—m$ antinodes which are generated at the respective moments when said transducer scans across each of said $n—m$ boundaries and $m$ nodes when said transducer scans across boundaries whereat the extent of said area does not substantially change; a wave transmission structure having an input terminal for receiving a signal and being adapted to propagate a received signal therealong; said structure being provided with a number of wave sampling taps equal to the greatest number of said boundaries in any symbol; each of said taps corresponding with a respective one of said antinodes; wherein adjacent ones of said sampling taps are spaced along said structure by a distance equal to the product of the velocity of wave propagation along said structure times the time interval separating the corresponding pairs of antinodes; and means for applying said transducer output signal to said transmission structure input terminal whereby at a particular instant each of said antinodes lies at a corresponding one of said taps of said transmission structure.

3. Apparatus as in claim 2 further including a plurality of identification channels, each of said channels corresponding with a different one of the symbols to be analyzed, each of said channels being adapted to receive a plurality of waveshape samples and in response thereto to produce an output signal denoting the presence of a corresponding waveshape derived from the symbol corresponding to said channel when said samples are derived from said corresponding waveshape, and means for applying the waveshape samples provided by said sampling taps to all of said identification channels.

4. Apparatus for recognizing each of a plurality of different waveshapes, all of said waveshapes having a first antinode and at least one later-occurring antinode, all of said later-occurring antinodes following the corresponding first antinode by one of $m$ predetermined time intervals, comprising: a wave sampling structure for receiving each waveshape to be recognized and having spaced sampling points for sampling each waveshape at all of said antinodes thereof for providing corresponding output signals, a plurality of transmission channels equal in number to the number of said different waveshapes, each of said channels corresponding to one of said waveshapes, means for applying the output signals of said sampling means to all of said channels, each of said channels being adapted to produce an output signal greater than that produced by any other of said channels when the waveshape corresponding thereto is applied to said sampling means, and sensing means coupled to receive the output signals of all of said channels and adapted to sense the output signals received thereby to determine the one of said output signals having the greatest amplitude and being further adapted to deliver a signal denoting the channel producing said greatest amplitude output signal.

5. Apparatus for sampling each of a plurality of different waveshapes, all of said waveshapes having a first antinode and at least one later-occurring antinode, all of said later-occurring antinodes following the corresponding first antinode by one of $m$ predetermined time intervals, comprising a wave transmission structure for propagating said waveshapes therealong, said structure being provided with a first wave sampling tap and $m$ wave sampling taps spaced therefrom; each of said $m$ sampling taps being spaced apart from said first sampling tap along said structure by a distance substantially equal to the distance a wave propagates along said structure in a respective one of said $m$ time intervals whereby all of the antinodes of each waveshape are sampled, a plurality of correlation networks, each of said networks corresponding to a different one of said waveshapes, each of said correlation networks being coupled to receive signals delivered by said sampling taps and being adapted to respond to only signals from the sampling taps which are opposite antinodes when the waveshape corresponding to said correlation network is at a predetermined position in said structure.

6. In apparatus for distinguishing between wave forms, each of which wave forms has points spaced in the same predetermined relationship in all the wave forms, at each of which occurs a node or an antinode dependent upon the particular wave form, the combination of a delay line, means to supply said waves to said line, means simultaneously to sample the voltage at spaced positions on said line corresponding to said points, at an instant when each of said waves extends across said positions and said node and antinodes lie at corresponding ones of said positions, and means to identify the wave form from the voltage samples derived only from said points.

7. In combination, means to produce a plurality of waves representative of different respective symbols, each wave having a plurality of points equally spaced in time at each of which points occurs a node or an antinode of voltage in accord with the symbol represented by the respective wave, a delay line, means to supply said waves to said line in succession, and means simultaneously to sample only the nodes and antinodes of voltage of each wave at a number of positions along said line corresponding to said points, said positions being electrically spaced along the line equally with the time required for said wave to travel between adjacent positions, said sampling means effecting said sampling when each wave lies with its nodes and antinodes at respective corresponding positions on said line.

8. In combination, means to produce a plurality of waves representative of different respective symbols, each wave having a plurality of points equally spaced in time at each of which points occurs a node or an antinode of voltage in accord with the symbol represented by the respective wave, a delay line, means to supply said waves to said line in succession, and means simultaneously to sample only the nodes and antinodes of voltage of each wave at a number of positions along said line corresponding to said points, said positions being electrically spaced along the line equally with the time required for said wave to travel between adjacent positions, said sampling means effecting said sampling when each wave lies with its nodes and antinodes at respective corresponding positions on said line, a plurality of circuits each corresponding to a respective one of said symbols, and means controlled by said sampling means to produce a pulse in that one of said circuits corresponding to the symbol represented by the instant wave on said line.

9. The combination, in a symbol recognition apparatus, of a magnetic pick up head, means to pass a symbol to be identified under said head at a predetermined velocity, said symbol comprising magnetic material of such shape and distribution that the amount of magnetic material influencing said head changes at certain of a plurality of regularly recurring spaced time intervals as said symbol passes said head and is constant at certain other of said intervals and between adjacent of said intervals whereby a wave is produced at the output of said head having an antinode at at least one of a plurality of regularly recurring points therein and a node at at least one other of said points, a wave transmission structure, means to supply said wave to said structure, and means to sample only nodal and antinodal voltage at regularly recurring positions along said structure spaced apart by the distance said wave travels in said structure in the time between said intervals and at an instant when each said antinode and node lie at positions on the line corresponding to the respective points in the wave.

10. The combination, in a symbol recognition apparatus, of a magnetic reading head having a magnetic gap across which each symbol is passed at uniform velocity, each of said symbols comprising magnetic material so distributed within it that it changes the flux across said gap only at one or more points of a greater number of fixed points in the relative positions of the respective symbol and gap as said symbol passes said gap and does not change said flux at other of said fixed points or at relative positions between said fixed points, said fixed points being spaced similarly with respect to each other for all the symbols, whereby each symbol produces a wave at the output of said transducer having within it a plurality of similarly spaced fixed points each corresponding to one of said first mentioned fixed points and having antinodal voltage at the one or more points within it corresponding to said first mentioned one or more fixed points and nodal voltage at all other of said fixed points, a wave transmission structure, means to pass said waves to said wave transmission structure whereby each of said waves at a particular instant stands on said structure with antinodal voltage and nodal voltage at positions thereon corresponding to those first mentioned fixed points at which flux changes and no flux changes respectively occur as the respective symbol passes said gap, a tap at each of said positions, and means to identify the respective symbols by the distribution of only antinodal voltage and nodal voltage which each symbol produces among said taps at a respective one of said particular instants.

11. In a system for recognizing a plurality of different symbols, the combination of: a magnetic transducer responsive to changes in the amount of magnetic material passing adjacent thereof; means for passing symbols to be recognized adjacent said transducer in succession, each symbol comprising magnetic material distributed such that the amount of magnetic material influencing said transducer changes only at certain ones of a plurality of predetermined spaced points depending upon the respective symbol, the distribution of magnetic material of each symbol being such that for each different symbol a respectively corresponding waveshape is produced by the passage of the symbol adjacent said transducer, each waveshape having a node or an antinode at each of said spaced points; a waveshape sampling structure connected to receive waveshapes from said transducer, said sampling structure having a plurality of sampling positions spaced apart from one another by distances corresponding relatively to the spacing of said predetermined spaced points for providing simultaneous signals corresponding only to said nodes and antinodes; and means responsive to said signals for manifesting the identity of the symbol corresponding to the waveshape being sampled.

12. In apparatus for identifying each of a plurality of different waveshapes, each of said waveshapes having a first antinode, at least one later-occurring node and at least one later-occurring antinode, each later-occurring node and antinode being spaced from said first antinode by one of a plurality of predetermined distances when each of said waveshapes is propagating along a wave transmission structure, means for sampling said waveshapes comprising: a wave transmission structure for receiving each waveshape to be identified and for propagating said waveshape therealong; a first sampling tap in said structure; and a plurality of additional sampling taps in said structure each spaced apart from said first sampling tap along said structure by a distance substantially equal to a corresponding one of said plurality of predetermined distances whereby said waveshape is sampled only at its nodes and antinodes.

13. In apparatus for identifying each of a plurality of different waveshapes, all of said waveshapes having a similarly spaced plurality of points of substantially zero slope, means for sampling said waveshapes comprising: a wave transmission structure for receiving each waveshape to be identified and for propagating said waveshape therealong; and a plurality of sampling taps in said structure spaced in correspondence with said plurality of points as said waveshape is propagated along said structure for sampling said waveshape only at points of substantially zero slope.

14. Apparatus for recognizing each of a plurality of different waveshapes, all of said waveshapes having a similarly spaced plurality of points of substantially zero slope, comprising: a wave transmission structure for receiving each waveshape to be identified and for propagating said waveshape therealong; a plurality of sampling taps in said structure spaced in correspondence with said plurality of points of said waveshape as said waveshape is propagated along said structure for sampling said waveshape only at said points of substantially zero slope and for providing corresponding output signals; a plurality of recognition channels, each channel corresponding to one of said waveshapes; means for applying said output signals from all of said sampling taps to each of said channels, each of said channels being adapted to produce an output signal greater than that produced by any other of said channels when the corresponding waveshape is sampled; and sensing means coupled to receive the output signals from said channels for producing a waveshape identification signal corresponding to the channel producing the greatest output signal.

15. Apparatus for recognizing each of a plurality of different waveshapes, all of said waveshapes having a similarly spaced plurality of points of substantially zero slope, comprising: a wave transmission structure for receiving each waveshape to be identified and for propagating said waveshape therealong; a plurality of sampling taps in said structure spaced in correspondence with said plurality of points of said waveshape as said waveshape is propagated along said structure for sampling said waveshape only at said points of substantially zero slope and for providing coorresponding output signals; and a recognition circuit coupled to said sampling taps and responsive to said output signals for producing a waveshape identification signal corresponding to the waveshape being sampled.

16. In apparatus for identifying each of a plurality of different waveshapes, all of said waveshapes having a similarly spaced plurality of points of substantially zero slope, means for sampling said waveshapes comprising: a delay line for receiving each waveshape to be identified and for propagating said waveshape therealong; and a plurality of sampling taps in said delay line spaced in correspondence with said plurality with points of said waveshape as said waveshape is propagated along said delay line for sampling said waveshape only at said points of substantially zero slope.

References Cited in the file of this patent

UNITED STATES PATENTS

| | | |
|---|---|---|
| 2,482,544 | Jacobsen | Sept. 20, 1949 |
| 2,495,740 | Labin | Jan. 31, 1950 |
| 2,680,151 | Boothroyd | June 1, 1954 |
| 2,701,274 | Oliver | Feb. 1, 1955 |
| 2,748,296 | Lipkin | May 29, 1956 |
| 2,846,666 | Epstein | Aug. 5, 1958 |
| 2,854,657 | Straube | Sept. 30, 1958 |
| 2,873,386 | Schlel | Feb. 10, 1959 |
| 2,897,481 | Shepard | July 28, 1959 |
| 2,924,812 | Merritt et al. | Feb. 9, 1960 |
| 2,927,303 | Elbinger | Mar. 1, 1960 |
| 2,961,649 | Eldredge et al. | Nov. 22, 1960 |
| 2,975,404 | Kups | Mar. 14, 1961 |
| 2,992,408 | Eldredge et al. | July 11, 1961 |
| 3,000,000 | Eldredge et al. | Sept. 12, 1961 |

FOREIGN PATENTS

| | | |
|---|---|---|
| 785,853 | Great Britain | Nov. 6, 1957 |

OTHER REFERENCES

"Teaching Machines to Read," SRI Journal, pp. 18–23, 1st quarter, 1957.